United States Patent [19]

Bu

[11] Patent Number: 5,430,697
[45] Date of Patent: Jul. 4, 1995

[54] INTRO-PLAY METHOD FOR COMPACT DISK GRAPHIC PLAYER

[75] Inventor: Byung-uk Bu, Suwon-city, Rep. of Korea

[73] Assignee: Samsung Electronics Co., Ltd., Kyungki-do, Rep. of Korea

[21] Appl. No.: 162,766

[22] Filed: Dec. 8, 1993

[30] Foreign Application Priority Data

Dec. 8, 1992 [KR] Rep. of Korea .......... 92-23535

[51] Int. Cl.⁶ .......................................... G11B 17/22
[52] U.S. Cl. .................................. 369/32; 369/44.28
[58] Field of Search ............... 369/32, 44.28, 48, 59, 369/49, 50; 360/19.1, 27, 35.1, 10.1; 358/335, 343, 909

[56] References Cited

U.S. PATENT DOCUMENTS 5,065,252  11/1991  Yoshio et al. .................. 358/335

Primary Examiner—Ali Neyzari
Attorney, Agent, or Firm—Sughrue, Mion, Zinn, Macpeak & Seas

[57] ABSTRACT

An intro-play method in which playback of a program for a predetermined time and program jumping operations are alternately and repeatedly pertbrined in a compact disk graphic player includes selecting one of audio information blocks recorded on the compact disk, reproducing the selected audio information block and the video information related to the audio information, and jumping to a position in which a succeeding audio information block is recorded, only when a point is detected at which effective information is not recorded in the video information. The method detects whether the display of effective video information is finished and performs the switching of programs in synchronization with the finish point of the reproduced information, to thereby smoothly carry out the switching of pictures in accordance with the switching of programs.

6 Claims, 4 Drawing Sheets

INTRO-PLAY METHOD FOR COMPACT DISK GRAPHIC PLAYER

BACKGROUND OF THE INVENTION

The present invention relates to an intro-play method for a compact disk graphic player in which playback of one program and jumping ahead to a succeeding program are alternately and repeatedly performed, and more particularly, to an intro-play method in which the proceeding to a subsequent program is prevented until the playback of graphics information related thereto is completed.

A compact disk recording/reproducing method is one in which binary information is recorded as a plurality of pits on a 12cm radius disk and the binary information is reproduced by irradiating a high-quality light such as a laser and reading out the intensity of the reflected light. Such a compact disk recording/reproducing method includes a compact disk (CD) mode for recording only audio information, a compact disk video (CDV) mode for recording audio and video (moving picture) information, and a compact disk graphics (CDG) mode for recording audio information along with still picture graphics information.

The present invention deals with an intro-play method for the CDG mode in which the information of a still picture is recorded in addition to the audio information.

A compact disk has, starting from the edge of the disk and moving radially inwards towards the center, a lead-out area, a program area and a lead-in area. A music signal is recorded in the program area the range of which is from 50mm to 116mm away from the center of the disk along the radius. The lead-out area contains a signal indicative of the end of a program. The lead-out signal which is a repetition pulse of 2Hz is recorded from the end point of the program area ( 116mm from the center of the disk along its radius) to 117 mm.

The lead-in area contains the number of pieces of music recorded on the disk, the performance time of the respective pieces of music, the overall performance time of the pieces of music, and the start address of the respective pieces of music. The lead-in area is called the table of contents (TOC). The TOC area begins from about 46mm away from the disk center to just before 50 mm, which is the start position of the program, along the radius of the compact disk of 120mm radius. In the TOC area, TOC signals are repeatedly recorded.

An intro-play method has been proposed which involves searching the recorded pieces of music using the various information recorded in the TOC area.

The intro-play function involves repeatedly performing an operation of reproducing a program recorded on the compact disk from the starting point thereof for a predetermined period (e.g., ten seconds) and then jumping to a succeeding program.

During the intro-play operation, the compact disk player reproduces the first recorded program from the initial point thereof for a predetermined period while referring to the TOC of the compact disk, and then shifts the optical pickup to the location of the second program so as to reproduce it. This operation is repeated until a user inputs a release instruction or a final program is reproduced.

When such an intro-play function is employed in a compact disk graphic player, since the "intro" playback time (e.g., ten seconds) assigned to the respective programs is constant, the switching of the recorded programs is not performed smoothly with respect to the switching among stored graphics images. For instance, if the playback time assigned to the respective programs is shorter than the time required for the graphics information related to a given program to be read out and displayed, the graphics image stops being displayed during its output and display onto a monitor (an operation which proceeds from the upper left to the lower right of the screen), and the image related to a succeeding program to be reproduced is then overwritten on the monitor starting from the upper left. Ultimately, the changing of the pictures is not smooth and is offensive to the human eye.

SUMMARY OF THE INVENTION

Therefore, it is an object of the present invention to provide an intro-play method for a compact disk graphic player in which the switching to a subsequent program is suppressed until a graphics image is completely formed on a display.

To accomplish the object, there is provided an intro-play method for use in a method for reproducing a series of audio information blocks recorded on a compact disk and video information related to the audio information, having the steps of: (a) selecting one of the audio information blocks recorded on the compact disk; (b) reproducing the audio information block selected in the step (a) and the video information related to the audio information; and (c) jumping to a position in which a succeeding audio information block is recorded, only when a point is detected at which effective information is not recorded in the video information.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENTS

Figures 1A, 1B:
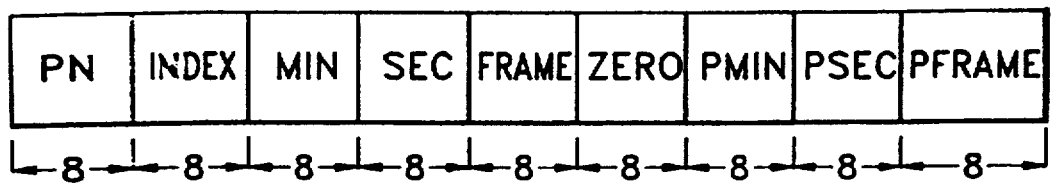
FIGS. 1A and 1B illustrate the contents recorded in the table-of-contents (TOC) of a compact disk.

Referring to FIG. 1A, the TOC data has an information unit of 72 bits which are divided into nine groups of eight bits each. Here, the PN of the TOC designates the index of the lead-in area and is assigned as a value of "00" in binary coded decimal (BCD) form, "INDEX" designates the index of respective programs, MIN, SEC and FRAME indicate the playing time of respective programs, and PMIN, PSEC and PFRAME designate the accumulative playing time. FIG. 1B specifically illustrates the contents recorded on the TOC. A compact disk player initially reads the contents of the TOC for use when selecting programs. The 8-bit "ZERO" block of FIG. 1A (located between the "FRAME" block and the "PMIN" block) and the 8-bit gap in FIG. 1B have an 8-bit value of "0" according to the CD standard.

Figure 2:
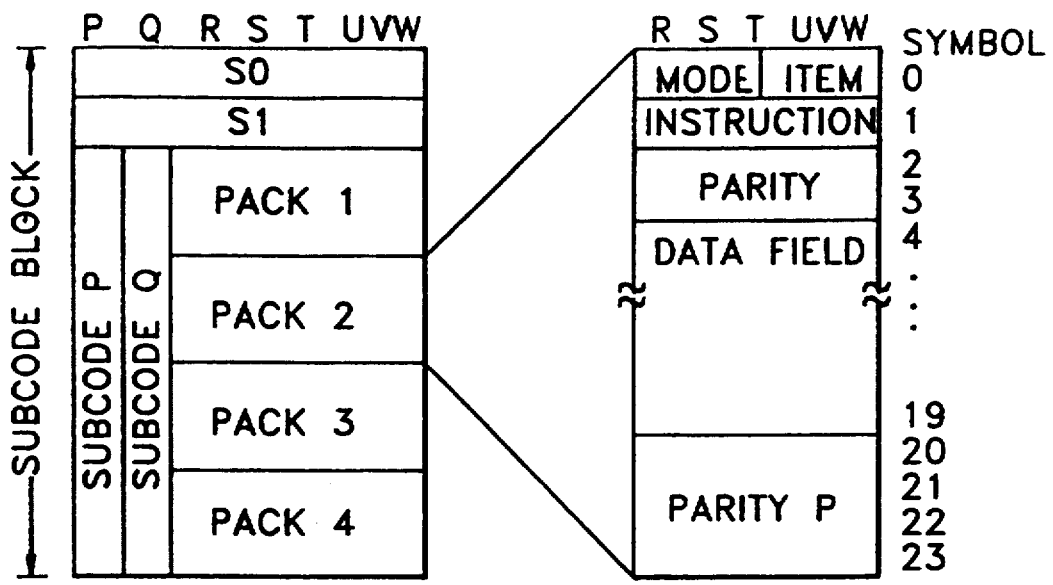
FIG. 2 shows the format of data recorded in the subcode area of a compact disk.

FIG. 2 shows a subcode format of a compact disk. The compact disk has areas in which subcode signals are recorded and which are set for every frame in which an audio signal is recorded. The subcode consists of eight subcode bits. The groups of the respective bits constitute eight channels represented by the letters P, Q, R, S, T, U, V and W. In the CDG mode, video information is recorded in six channels (R through W). The six bit groups of channels R-W are called symbols. One block is composed of 98 symbols. The first two of the 98 symbols are used as sync signals $S_0$ and $S_1$. Here, 24 symbols form one pack and four packs constitute one packet.

The first symbol (hereinafter referred to as symbol 0) of 24 symbols indicates a mode-item combination having three bits called "mode" and three bits called "item." Symbol 1 being subsequent to symbol 0 is called "instruction" which designates the kind of data fields in each pack. Symbol 2 and symbol 3, which are subsequent to symbol 1, are error correction codes for symbol 0 through symbol 3 (parity). Subsequent to symbol 3, symbol 4 through symbol 19 are data fields. Symbols 20, 21, 22 and 23 are error correction codes for protecting the information of a pack (pack parity).

The mode-item combination is formed as shown in the following table.

| MODE | ITEM | |
|---|---|---|
| 0(000) | 0(000) | ZERO MODE |
| 1(001) | 0(000) | LINE-GRAPHICS MODE |
| 1(001) | 0(001) | TV-GRAPHICS MODE |
| 7(111) | 0(000) | USER MODE |

Referring to the above, the zero mode indicates a "no video information" condition in which the data field of a pack consists entirely of zeros. The line-graphics mode is to provide characters and a graphics screen consisting of 288 ×24 (horizontal-by-vertical) pixels, while the TV-graphics mode is designed to provide characters and a 288×192 pixel graphics screen.

Figure 3:
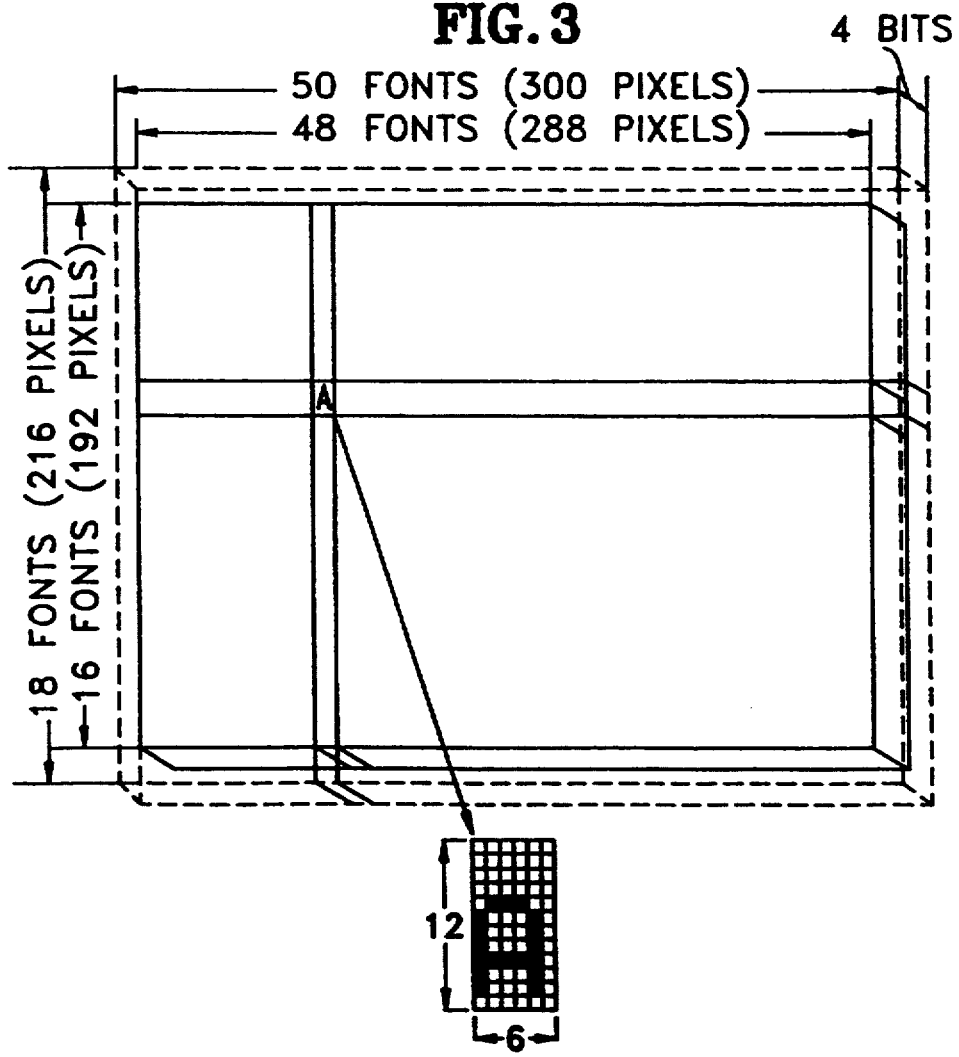
FIG. 3 shows the screen area in a TV-graphics mode.

Referring to FIG. 3, a graphics image is generally processed in units of fonts made up of 6×12 pixels (horizontal-by-vertical). The number of fonts which can be expressed in the TV-graphics mode is 48 horizontally and 16 vertically. This area is called the "screen area." To perform a scroll function, one font of a space called "border" is provided above and below and to the left and right of the screen area. Therefore, the actual screen area of the TV-graphics mode occupies an area consisting of 50×18 fonts. The graphics data contains an address and data corresponding to the respective fonts of the screen area. A graphics screen is formed by reading out graphics data reproduced from the R-W channels of the subcode area using a graphics demodulator (not shown).

In the intro-play operation, a microcomputer in the compact disk player shifts an optical pickup to the initial frame of the first recorded program, by referring to the contents recorded on the TOC, so as to read out and reproduce audio data.

After the first program is reproduced for a predetermined period, the microcomputer operation proceeds to the second program so as to reproduce audio data in the same manner as that of the first program. This process is repeated until a user inputs a release instruction or the final program is reproduced. The intro-play operation is performed by time-divisionally reproducing the respective programs for a predetermined period.

If such a time-divisional control method is employed in the CDG mode, this creates a phenomenon in which the switching of programs and the switching of pictures are not smoothly performed.

Specifically, if the predetermined period of time (e.g., ten seconds) assigned to the respective programs is shorter than the time required during which one picture of video information related to the program's audio information has been formed, the program currently being reproduced is switched to another one in the middle of the displaying of the graphics image on a display device. This causes an erratic change of partially displayed pictures which is visually offensive. Furthermore, in a case where the switching to the succeeding program occurs after the picture is displayed and a specific time passes, the overall operation time is ineffectively increased.

In the intro-play operation, the CDG mode requires a method of synchronizing the switching of programs with the switching of pictures and thereby provides for harmonious operation. To accomplish this, in the present invention, the end point of effective video information is detected, at which time, program switching is then carried out.

Figure 4:
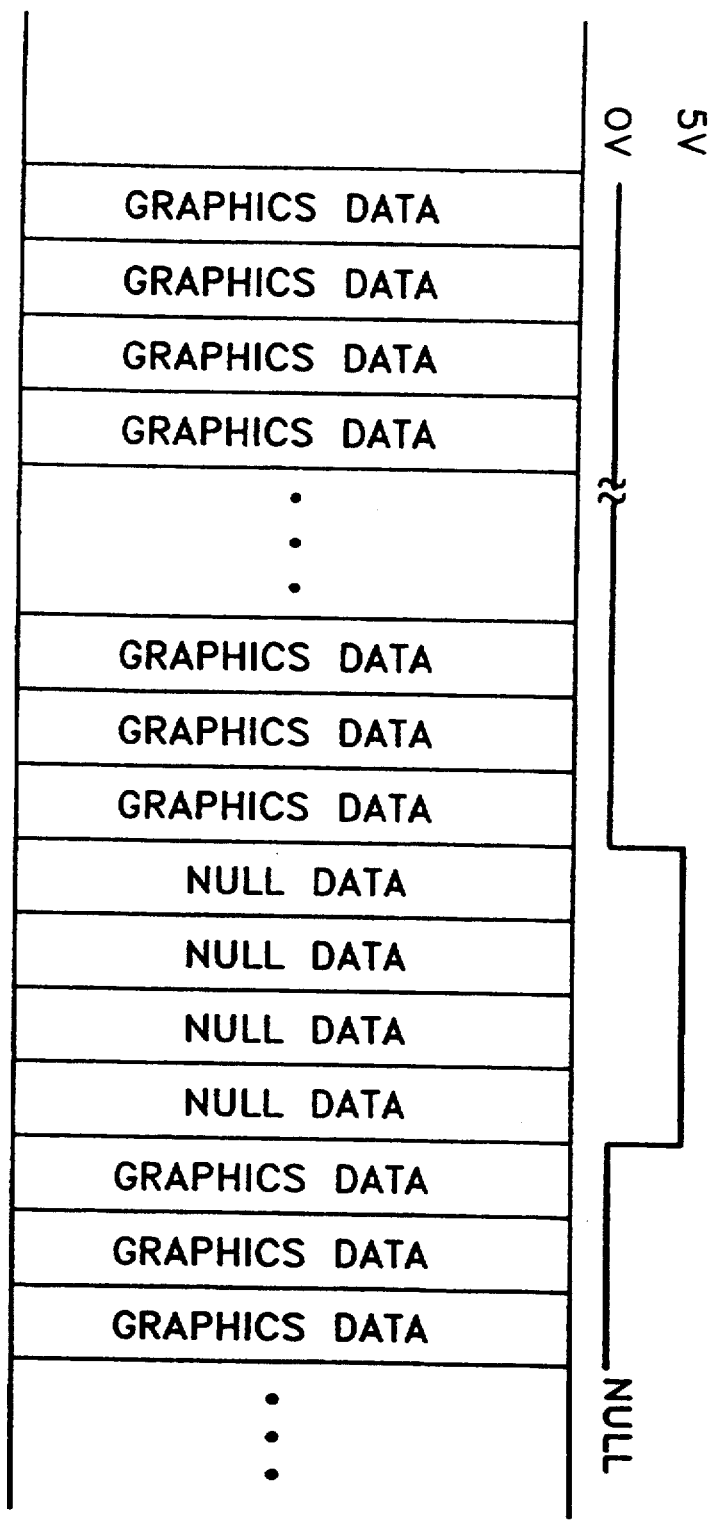
FIG. 4 shows the stream of graphics data.

In FIG. 4, only the data fields of sequential packs of FIG. 2 are extracted. A graphics image data is one extracted from a pack having a graphics mode. Null data is one extracted from a pack without a graphics mode. Using this data, when the graphic demodulator checks for the absence or presence of effective video information, the alemodulator can form a signal (null signal) indicative of a null data area.

Here, the start point and end point of the null signal represent the border of the effective graphic information and null data, that is, the start point and end point of the video information constituting one picture. In the present invention the program switching is synchronized with the switching of graphics images.

Figure 5:
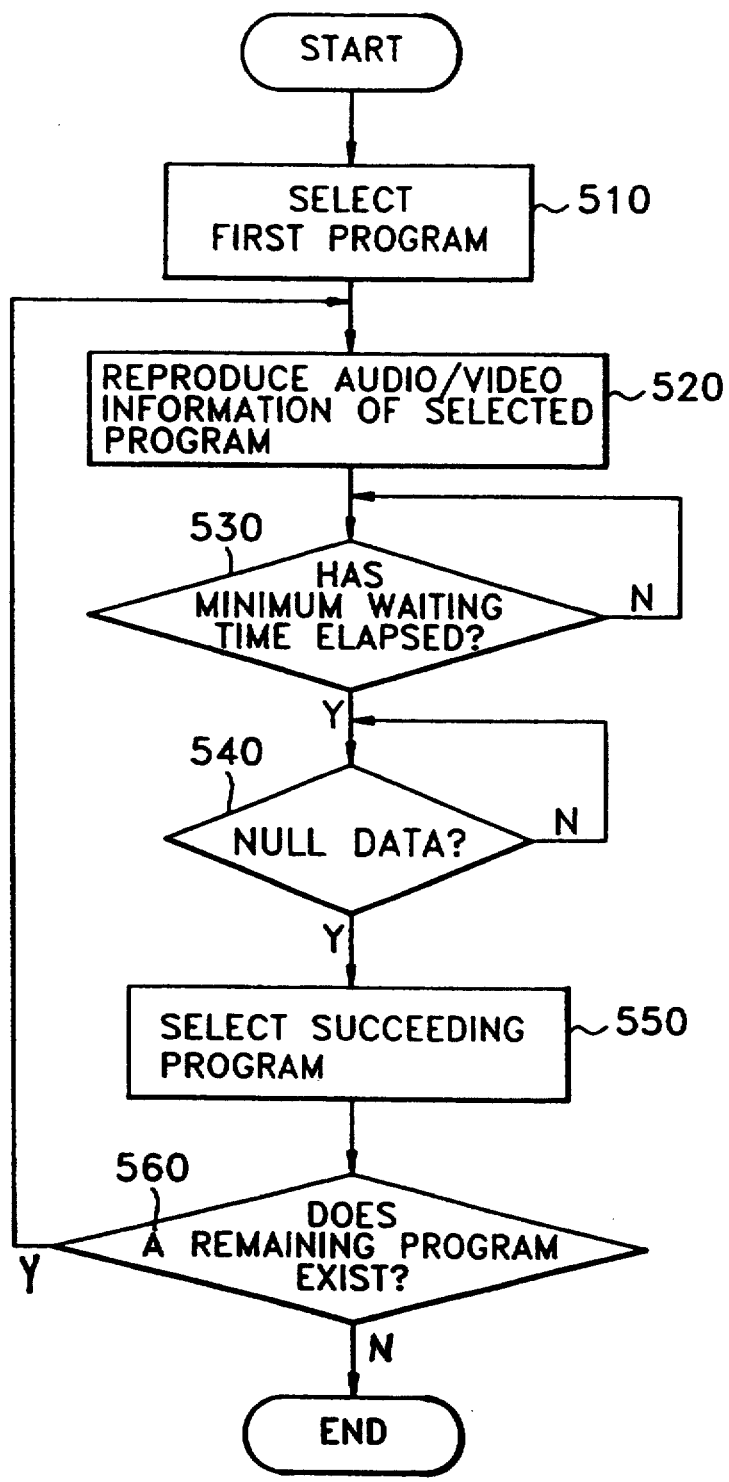
FIG. 5 is a flowchart illustrating an intro-play method of the present invention.

Referring to FIG. 5, when the intro-play operation begins, the microcomputer mounted on the compact disk graphic player selects the first program while referring to the TOC, and conveys the optical pickup to the initial frame thereof (STEP 510).

The audio information of the first frame and the video information of the subcode area of the selected program are read out and reproduced (STEP 520).

A predetermined waiting time passes. Here, the waiting time is set to be the shortest playback time in the intro-play function (STEP 530).

A null signal is checked to detect whether null data is present (STEP 540).

If the currently processed graphics data is one having effective graphics information, the playback operation is continued, but if the data is ineffective graphics information, switching to the subsequent program is carried out (STEP 550).

If there is no program remaining, e.g., the last piece of music has been played, the intro-play operation is finished, and if a program or programs remain, step 520 is executed again (STEP 560).

As described above, the intro-play method of the compact disk graphic mode of the present invention detects whether the display of effective video information is finished and performs the switching of programs in synchronization with the finish point of the reproduced information, so that the switching of pictures in accordance with the switching of programs is carried out smoothly.

It should be noted that the present invention can be modified into various forms provided that the essence of the invention is not changed. For instance, the present invention can be employed so as to perform the switching of various pieces of music while synchronized with the frame period of video information in a compact disk video (CDV) mode.

What is claimed is:

1. An intro-play method for reproducing a series of audio information blocks recorded on a compact disk and video information related to the audio information, comprising the steps of:
   (a) determining a sequence of the series of audio information blocks;
   (b) selecting one of said audio information blocks recorded on said compact disk;
   (c) reproducing said audio information block selected in step (b) and said video information related to said audio information for a predetermined time;
   (d) continuing to reproduce said audio information if it is detected that effective information is recorded in said video information and jumping to a position in which a succeeding audio information block in the sequence is recorded only when a point is detected at which effective information is not recorded in said video information:
   e) repeating steps (c) and (d) until all the audio information blocks in the series have been reproduced or until a user enters a release instruction.

2. An intro-play method as claimed in claim 1, wherein said video information is graphics information recorded in the subcode area of said compact disk.

3. An intro-play method as claimed in claim 1, wherein step (b) has an initial condition in which a first audio information block recorded in the recording direction of said compact disk is selected from said audio information blocks.

4. The method of claim 1, wherein step (d) involves generating a binary signal of one logic level when said video information contains effective information and of another logic level when said video information does not contain effective information.

5. The method of claim 1, wherein the video information for a complete picture comprises graphics data areas where graphics data is recorded and null data areas where graphics data is not recorded.

6. The method of claim 5, wherein step (d) involves determining whether the graphics data areas or the null data areas of said video information are being reproduced, and allowing jumping to the succeeding audio information block in said sequence only when said null data areas are being reproduced.

* * * * *